(12) United States Patent
Harada et al.

(10) Patent No.: US 11,753,985 B2
(45) Date of Patent: Sep. 12, 2023

(54) ENGINE

(71) Applicant: Mazda Motor Corporation, Hiroshima (JP)

(72) Inventors: Yuji Harada, Aki-gun (JP); Kenji Uchida, Aki-gun (JP); Ryohei Ono, Aki-gun (JP); Masayuki Kidokoro, Aki-gun (JP); Kazuhiro Nagatsu, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/987,473

(22) Filed: Nov. 15, 2022

(65) Prior Publication Data

US 2023/0175426 A1  Jun. 8, 2023

(30) Foreign Application Priority Data

Dec. 6, 2021  (JP) .................................. 2021-198056

(51) Int. Cl.
*F02B 19/10*  (2006.01)

(52) U.S. Cl.
CPC ........ *F02B 19/1023* (2013.01); *F02B 19/108* (2013.01); *F02B 19/1014* (2013.01)

(58) Field of Classification Search
CPC ...... F02B 19/1014; F02B 19/12; F02B 19/16; F02B 19/18
See application file for complete search history.

(56) References Cited

U.S. PATENT DOCUMENTS

| | | | | |
|---|---|---|---|---|
| 2,287,637 A | * | 6/1942 | Oyler | F02B 19/1004 |
| | | | | 123/286 |
| 3,980,057 A | * | 9/1976 | Sanda | F02B 19/12 |
| | | | | 123/270 |
| 4,180,044 A | * | 12/1979 | Sanda | F02B 19/12 |
| | | | | 123/260 |
| 5,603,298 A | * | 2/1997 | Kawamura | F02B 19/02 |
| | | | | 123/292 |
| 2019/0078498 A1 | * | 3/2019 | Bedogni | F02B 19/1019 |
| 2021/0222643 A1 | | 7/2021 | Nagatsu et al. | |

FOREIGN PATENT DOCUMENTS

| | | |
|---|---|---|
| JP | 2018066369 A | 4/2018 |
| JP | 2021113549 A | 8/2021 |

* cited by examiner

*Primary Examiner* — Logan M Kraft
*Assistant Examiner* — Anthony L Bacon
(74) *Attorney, Agent, or Firm* — Alleman Hall Creasman & Tuttle LLP

(57) ABSTRACT

To meet both a request to improve the thermal efficiency in the medium load operation of an engine and a request to suppress knocking in the high load and high rotation operation of the engine, the engine includes a main combustion chamber comprising a cylinder block, a cylinder head, and a piston; a pre-chamber having a plurality of injection holes that open into the main combustion chamber; and a spark plug that ignites an air-fuel mixture in the pre-chamber. A compression ratio of the main combustion chamber is not less than 14 and not more than 24. A first index, which is the product between a total cross-sectional area of the plurality of injection holes and the compression ratio, is not less than 0.1496 cm$^2$ and not more than 0.8449 cm$^2$.

20 Claims, 9 Drawing Sheets

ENGINE

TECHNICAL FIELD

The present disclosure relates to an engine.

BACKGROUND ART

Pre-chamber ignition is known as a technique for improving the thermal efficiency of a reciprocating engine. In this technique, a small pre-chamber is provided separately from a main combustion chamber including a cylinder block, a cylinder head, and a piston, and an air-fuel mixture is ignited in the pre-chamber so that a flame is ejected as a jet blast through the injection holes of the pre-chamber into the main combustion chamber. This technique is attracting attention as the thermal efficiency is improved because the air-fuel mixture in the main combustion chamber burns faster than in normal flame propagation. The tip of the spark plug is covered with a cap-shaped partition wall, which separates the tip from the main combustion chamber, to form the pre-chamber and a plurality of injection holes are formed in the partition wall.

Pre-chamber ignition is classified into an active type and a passive type. The active type has an injector in the pre-chamber and forms an air-fuel mixture required for ignition in the pre-chamber. The passive type does not have an injector in the pre-chamber and guides the air-fuel mixture formed in the main combustion chamber in the compression stroke to the vicinity of the spark plug through the injection holes. JP2018-66369A illustrates an example of active type pre-chamber ignition and JP2021-113549A illustrates an example of passive type pre-chamber ignition.

SUMMARY OF THE INVENTION

Problem to be Solved by the Invention

In the case of the passive type, when the volume of the pre-chamber and the diameter and the number of injection holes are determined, the jet potential of the flame that is ejected from the pre-chamber to the main combustion chamber, that is, a maximum value RETmax of the energy transfer ratio from the pre-chamber to the main combustion chamber is uniquely determined. Accordingly, it is difficult to meet both a request to improve the thermal efficiency in a medium load operation of an engine and a request to suppress knocking in a high load operation of the engine at the same time.

For example, exhaust gas recirculation (EGR) is performed to reduce $NO_x$ emissions and improve fuel efficiency in the medium load operation. Since the EGR gas flows into the pre-chamber, a misfire is likely to occur after ignition. The specifications of the pre-chamber may be determined with the object of causing the air-fuel mixture to easily flow into the pre-chamber and increasing the jet potential to meet a request to prevent a misfire and improve the thermal efficiency in the medium load operation. In that case, however, a highly concentrated air-fuel mixture enters the pre-chamber in the high load operation, so the jet potential becomes excessively large and knocking occurs easily. In contrast, when the specifications of the pre-chamber are determined with the object of suppressing the jet potential to suppress knocking at high load, the above request in the medium load operation cannot be met.

An object of the present disclosure is to meet both a request to improve the thermal efficiency in the medium load operation of an engine and a request to suppress knocking in the high load operation of the engine.

Means for Solving the Problem

As a result of various studies on pre-chamber ignition, the inventors have found that both a request to improve the thermal efficiency in a medium load exhaust gas recirculation (EGR) operation and a request to suppress knocking in a high load and high rotation operation can be met by this ignition combustion system. In addition, the inventors of the present application have detected that the knocking index (knock strength) in the high load and high rotation operation is a function of a jet potential and a local minimum point (inflection point) is present in this function. This means that the occurrence of knocking in the high load and high rotation operation can be suppressed by keeping the jet potential within a range around the local minimum value.

An engine according to the present disclosure includes a main combustion chamber including a cylinder block, a cylinder head, and a piston; a pre-chamber having a plurality of injection holes that open into the main combustion chamber; and a spark plug that ignites an air-fuel mixture in the pre-chamber. A compression ratio $\varepsilon$ of the main combustion chamber is not less than 14 and not more than 24, and an index $St \cdot \varepsilon$ that is a product between a total cross-sectional area St of the plurality of injection holes and the compression ratio $\varepsilon$ is not less than 0.1496 $cm^2$ and not more than 0.8449 $cm^2$.

The compression ratio $\varepsilon$ can be determined based on requests for thermal efficiency and ignition timing. On the other hand, when the compression ratio $\varepsilon$ is small, the filling degree of air or the air-fuel mixture from the main combustion chamber to the pre-chamber is small. Accordingly, the compression ratio $\varepsilon$ is not less than 14 with the object of obtaining, in the pre-chamber, the air-fuel mixture that is surely ignited by firing in the medium load EGR operation. However, since an increase in the compression ratio $\varepsilon$ easily causes knocking at a high load and high rotation, the upper limit is 24.

The index $St \cdot \varepsilon$ is not less than 0.1496 $cm^2$ and not more than 0.8449 $cm^2$ with the object of suppressing knocking in the high load and high rotation operation and improving the thermal efficiency in the medium load EGR operation.

Here, to increase the jet potential, the total cross-sectional area St needs to be increased with the object of making the exchange of gas in the pre-chamber successful. In contrast, to reduce the jet potential, the total cross-sectional area St needs to be reduced. Accordingly, the index $St \cdot \varepsilon$ becomes larger as the jet potential is larger, and the index $St \cdot \varepsilon$ becomes smaller as the jet potential is smaller.

Since the filling degree of the air-fuel mixture from the main combustion chamber to the pre-chamber becomes higher as the compression ratio $\varepsilon$ is larger, the jet potential more easily becomes larger. In order to obtain the jet potential with the same magnitude, the total cross-sectional area St needs to be small when the compression ratio $\varepsilon$ is large, while the total cross-sectional area St needs to be large when the compression ratio $\varepsilon$ is small. Accordingly, in the index $St \cdot \varepsilon$ obtained by multiplying the total cross-sectional area St by the compression ratio $\varepsilon$, the amount of change (increase amount/decrease amount) in the compression ratio $\varepsilon$ is leveled by the amount of change (increase amount/decrease amount) in the total cross-sectional area St.

Accordingly, even if the compression ratio $\varepsilon$ increases or decreases, the total cross-sectional area St increases or decreases so as to cancel the increase or decrease in the compression ratio ε, so the effect of the compression ratio ε on the first index St·ε is mitigated. The index St·ε mainly depends on the jet potential.

Accordingly, the jet potential can be uniquely defined regardless of the magnitude of the compression ratio ε by obtaining the index St·ε based on the total cross-sectional area St (the number of injection holes multiplied by the diameter of injection holes) and the compression ratio ε.

Then, by setting the index St·ε to a value not less than 0.1496 cm$^2$ and not more than 0.8449 cm$^2$, the jet potential can be kept within the range near the local minimum value in the function of the knocking index in the high load and high rotation operation. Accordingly, knocking can be suppressed from occurring due to an excessive increase in the jet potential in the high load and high rotation operation.

Furthermore, since the index St·ε is not less than 0.1496 cm$^2$, the jet potential can be prevented from becoming excessively small in the medium load EGR operation. That is, the thermal efficiency can be advantageously improved by obtaining a desired jet potential in the medium load EGR operation.

As described above, it is possible to meet both the request to improve the thermal efficiency in the medium load EGR operation of the engine and the request to suppress knocking in the high load and high rotation operation of the engine.

In an embodiment, the index St·ε is not less than 0.2829 cm$^2$ and not more than 0.7590 cm$^2$. This can more advantageously suppress knocking in the high load and high rotation operation.

In an embodiment, the index St·ε is not less than 0.4611 cm$^2$ and not more than 0.5817 cm$^2$. This can still more advantageously suppress knocking in the high load and high rotation operation.

In an embodiment, a maximum value of an energy transfer ratio from the pre-chamber to the main combustion chamber is not less than 0.95 J/degree and not more than 1.6 J/degree under a high load and high rotation operation condition of the engine. This can more surely suppress knocking in the high load and high rotation operation.

In an embodiment, a volume of the pre-chamber is not less than 0.12 cm$^3$ and not more than 0.328 cm$^3$.

The volume of the pre-chamber affects the magnitude of the jet potential. Since the volume is not less than 0.12 cm$^3$, a relatively large jet potential can be obtained even in the medium load EGR operation. On the other hand, since the upper limit of the volume is 0.328 cm$^3$, the jet potential can be prevented from becoming excessively large at the high load and high rotation.

In an embodiment, the number of the injection holes is not less than four and not more than six. This can easily keep the index St·ε within the range described above.

In an embodiment, an injector that injects fuel to form the air-fuel mixture is provided so as to inject the fuel into the main combustion chamber. According to the embodiment, the air-fuel mixture can be introduced to the periphery of the spark plug in the pre-chamber through the injection holes even in the passive type pre-chamber ignition that does not have the injector in the pre-chamber.

Advantage of the Invention

According to the present disclosure, it is possible to meet both the request to improve the thermal efficiency in the medium load EGR operation of an engine and the request to suppress knocking in the high load and high rotation operation of the engine.

BRIEF DESCRIPTION OF THE DRAWINGS

FIG. 2A is a side view in which a cross section is partially illustrated. FIG. 2B is a diagram seen from below.

MODES FOR CARRYING OUT THE INVENTION

An embodiment of the present disclosure will be described with reference to the drawings. The description of the preferred embodiment described below is only an example and is not intended to limit the present disclosure, application thereof, or use thereof.

<Structure of an Engine>

The embodiment relates to a reciprocal engine for driving a vehicle installed in the vehicle.

Figure 1:
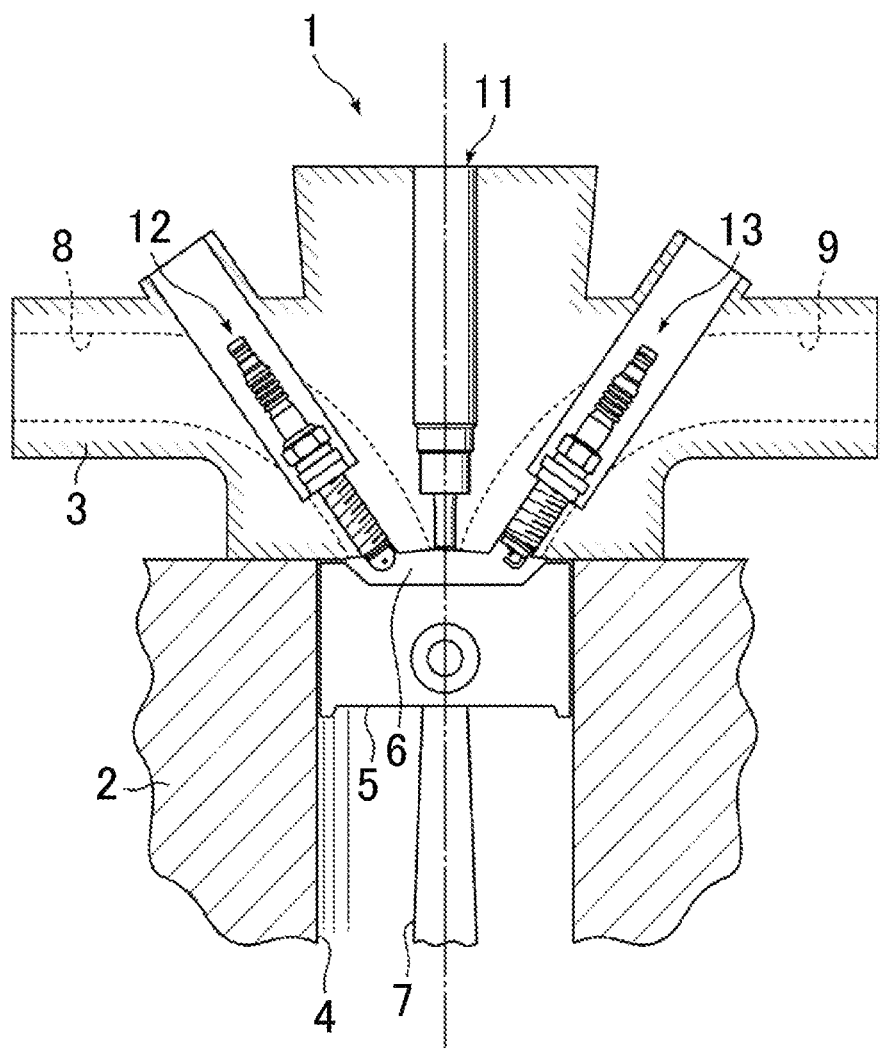
FIG. 1 is a structural diagram schematically illustrating an engine.

As illustrated in FIG. 1, an engine 1 includes a cylinder block 2 and a cylinder head 3. A cylinder 4 is formed in the cylinder block 2. A connecting rod 7 coupled to a crankshaft is connected to a piston 5 provided in the cylinder 4, so that the piston 5 reciprocates in the cylinder 4. A main combustion chamber 6 of the engine is formed by the cylinder block 2, the cylinder head 3, and the piston 5.

An intake port 8 and an exhaust port 9 are formed in the cylinder head 3. Although not illustrated, an intake valve and an exhaust valve are provided in the intake port 8 and the exhaust port 9, respectively, so as to open and block the openings close to the main combustion chamber 6.

Although not illustrated, an intake passage is connected to the intake port 8 and an exhaust passage is connected to the exhaust port 9. An exhaust gas recirculation (EGR) passage that circulates part of exhaust gas having passed through a three-way catalyst to the intake passage is connected to the exhaust passage. The EGR passage is provided with an EGR cooler and an EGR valve that controls the flow rate of exhaust gas flowing through the EGR passage.

An injector 11 that injects fuel to form an air-fuel mixture into the main combustion chamber 6, a pre-chamber plug 12 with a pre-chamber described later, and a normal spark plug 13 without a pre-chamber are attached to the cylinder head 3. The injector 11 is provided on the cylinder axis so that the tip thereof faces the central portion of the main combustion chamber 6. The pre-chamber plug 12 and the normal spark plug 13 are disposed on both sides of the injector 11 so as to sandwich the injector 11.

The pre-chamber plug 12 is provided near the intake port 8 and extends diagonally downward from a portion near the intake port 8 so that the tip thereof faces the main combustion chamber 6. The normal spark plug 13 is provided near the exhaust port 9 and extends diagonally downward from a portion near the exhaust port 9 so that the tip thereof faces the main combustion chamber 6. It should be noted that the pre-chamber plug 12 may be provided in a portion near the exhaust port 9 and the normal spark plug 13 may be provided in a portion near the intake port 8.

Figure 2A:
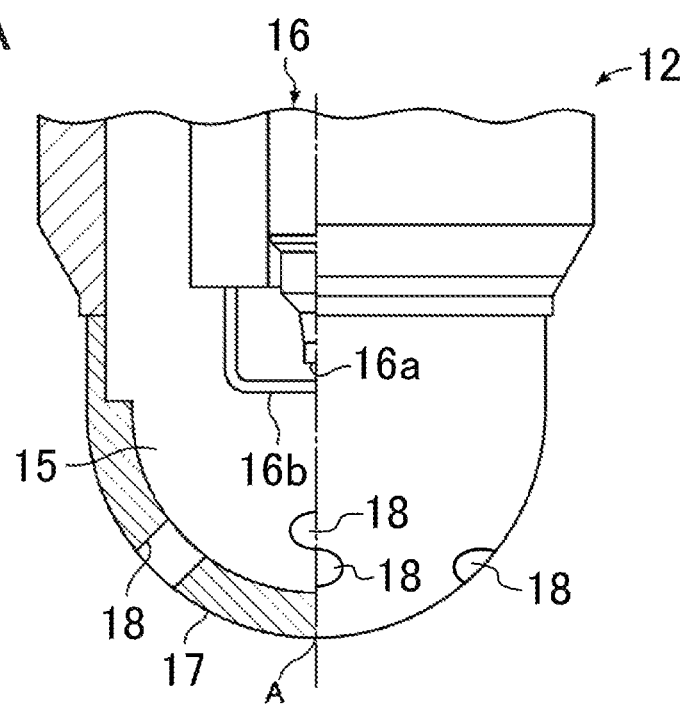
FIGS. 2A and 2B are diagrams illustrating a pre-chamber plug.

As illustrated in FIG. 2A, a pre-chamber 15 is formed at the tip of the pre-chamber plug 12, and a spark plug 16 is provided in the pre-chamber 15. The spark plug 16 has a center electrode 16a and a side electrode (ground) 16b as in the normal spark plug 13.

The pre-chamber 15 is provided in the main combustion chamber 6, but can burn the air-fuel mixture in the pre-chamber 15 independently of the main combustion chamber 6. More specifically, the pre-chamber 15 functions as a sub-combustion chamber that causes flame propagation within the pre-chamber 15 by igniting the air-fuel mixture therein with the spark plug 16.

Figure 2B:
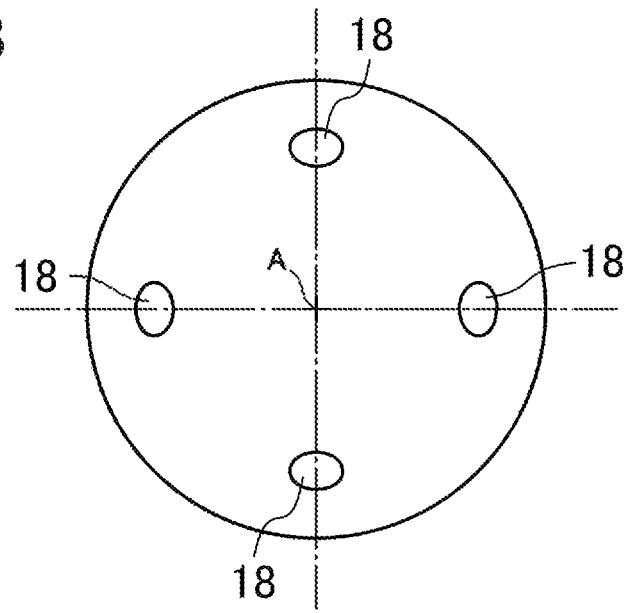

As illustrated in FIGS. 2A and 2B, the pre-chamber 15 is formed by a hemispherical pre-chamber forming portion 17 having a predetermined diameter and a predetermined thickness. A plurality of injection holes 18 that open into (communicate with) the main combustion chamber 6 are formed in the pre-chamber forming portion 17.

These injection holes 18 are provided to cause the air-fuel mixture in the main combustion chamber 6 to flow into the pre-chamber 15, the flame generated in the pre-chamber 15 by ignition of the air-fuel mixture is injected and radiated into the main combustion chamber 6, so that the air-fuel mixture within the main combustion chamber 6 burns faster.

Basically, the air-fuel mixture includes fresh air from the intake port 8 and the fuel injected from the injector 11 when the EGR valve is closed, and the air-fuel mixture includes fresh air from the intake port 8, the exhaust gas through the EGR passage, and the fuel injected from the injector 11 when the EGR valve is open. It should be noted that the fuel is gasoline as liquid fuel.

In the embodiment, four injection holes 18 are provided at 90° intervals about the axis passing through an apex A of a pre-chamber forming portion 17 in plan view seen from below illustrated in FIG. 2B. The injection holes 18 are formed so as to extend in the directions of 45° at the positions located 45° from the apex A of the hemispherical pre-chamber forming portion 17 as illustrated in FIG. 2A. This causes the flame to be ejected through the injection holes 18 at an angle of 45° with respect to the axis passing through the apex A.

It should be noted that the number and the positions of the injection holes 18 are not limited to these values and, for example, five or six injection holes 18 may be provided at equal intervals about the axis passing through the apex A in plan view seen from below, or less than four or not less than seven injection holes may be provided. The number of injection holes 18 is preferably not less than four and not more than six. In addition, the injection holes 18 may be straight holes extending in the directions of 45° or swirl holes extending while being inclined laterally with respect to the directions of 45°. The diameter of the injection holes 18 is preferably not less than 0.7 mm and not more than 1.5 mm.

<Specifications of the Engine and the Pre-Chamber>

In the embodiment, a bore stroke ratio (S/B), which is the ratio of the piston stroke (stroke S) to the cylinder bore (inner diameter B), is preferably not less than 1 and not more than 1.5. The stroke volume is preferably not less than 500 cc and not more than 700 cc, more preferably 500 cc. A compression ratio $\varepsilon$ of the main combustion chamber is preferably not less than 14 and not more than 24, more preferably not less than 16 and not more than 18.

A volume V of the pre-chamber 15 is preferably not less than 0.12 cm$^3$ and not more than 0.328 cm$^3$, more preferably not less than 0.2 cm$^3$ and not more than 0.328 cm$^3$. An aperture ratio $\beta(=St/V)$, which is the ratio of a total cross-sectional area St (sum of the cross-sectional areas of the injection holes 18) of the plurality of injection holes 18 to the volume V of the pre-chamber 15, is preferably not less than 0.0078 mm$^{-1}$ and not more than 0.0145 mm$^{-1}$, more preferably not less than 0.0078 mm$^{-1}$ and not more than 0.011 mm$^{-1}$.

<Manufacturing of the Engine>

The method of manufacturing the engine will be described.

Figure 3:
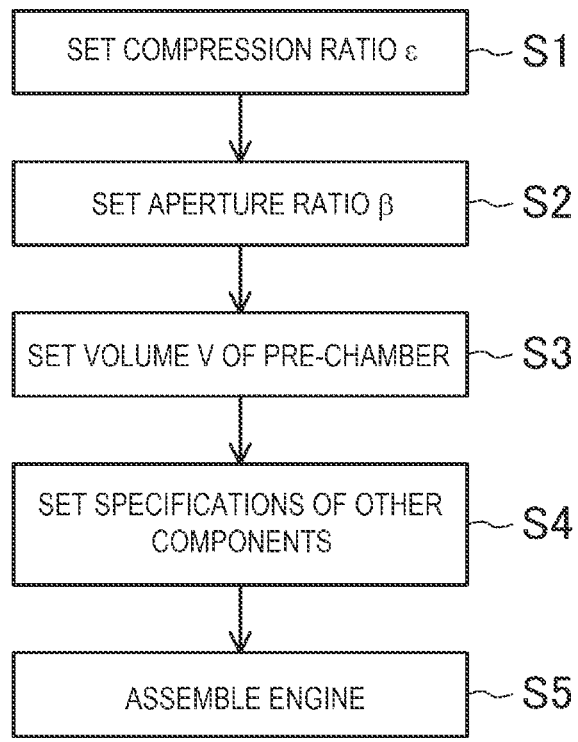
FIG. 3 is the process flow chart of a method of manufacturing the engine.

As illustrated in FIG. 3, in a first step S1, the compression ratio $\varepsilon$ is set so as to fall within the range from 14 to 24. The compression ratio $\varepsilon$ is set to, for example, 15 or 17 in terms of the thermal efficiency, the ignition timing, and the like.

In a second step S2, the upper limit $\beta$max and the lower limit $\beta$min of the aperture ratio $\beta$ are determined based on the compression ratio $\varepsilon$ determined in the first step S1 by using the dependence of the pressure difference between the main combustion chamber and the pre-chamber on the compression ratio $\varepsilon$ and the aperture ratio $\beta$. The aperture ratio $\beta$ is set so as to fall within the range from the lower limit $\beta$min to the upper limit $\beta$max.

In a third step S3, the volume V of the pre-chamber is set based on the compression ratio $\varepsilon$ set in the first step S1 and the aperture ratio $\beta$ set in the second step S2 by using the dependence of the jet potential on the compression ratio $\varepsilon$, the aperture ratio $\beta$, and the volume V of the pre-chamber.

In a fourth step S4, the specifications of the other engine components (engine stroke volume, clearance volume, piston stroke S, bore diameter B, and the number and displacement of injection holes through which the main combustion chamber communicates with the pre-chamber) are set. Since the volume V of the pre-chamber and the aperture ratio $\beta$ have been determined, if the number of the injection holes is determined, the diameter of the injection holes is determined by assuming the injection holes to be circular.

In a fifth step S5, the components constituting the engine are designed, manufactured, and assembled based on the specifications set in the second step S2 to the fourth step S4.

It should be noted that the specifications of the engine structural components that do not involve the compression ratio $\varepsilon$, the aperture ratio $\beta$, or the volume V of the pre-chamber can be set in advance concurrently with the first step S1 to the third step S3. (About the second step S2 (determination of $\beta$max and $\beta$min))

The upper limit aperture ratio βmax and the lower limit aperture ratio βmin are determined by assuming that a pressure difference ΔP between the main combustion chamber 6 and the pre-chamber 15 depends on the compression ratio ε and the aperture ratio β. The specific description will be given below.

Figure 4:
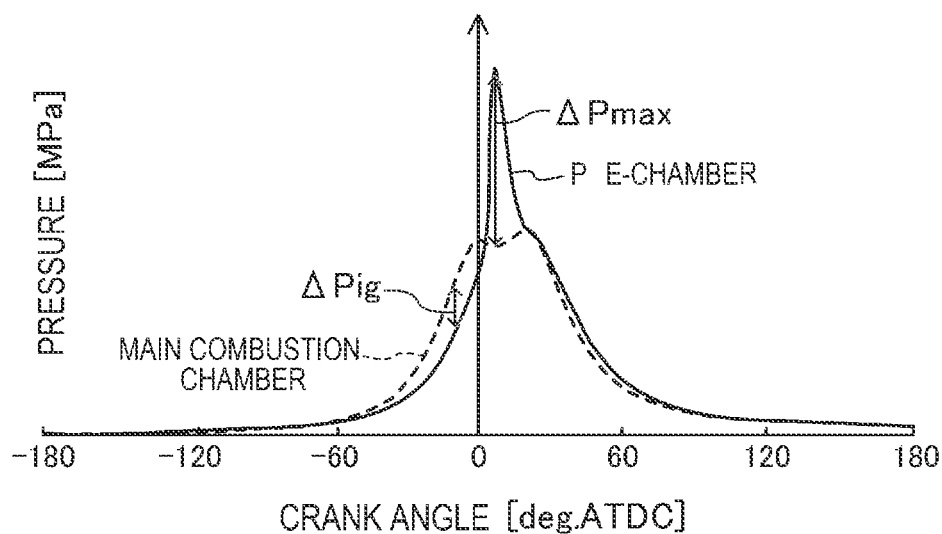
FIG. 4 is a graph illustrating changes in the pressure in a main combustion chamber and changes in the pressure in the pre-chamber in a compression stroke and an expansion stroke of the engine.

The upper limit aperture ratio βmax is determined based on the compression ratio ε so that the pressure difference ΔP between the main combustion chamber 6 and the pre-chamber 15 when the pressure in the pre-chamber 15 is maximized under the medium load and medium rotation EGR operation condition of the engine is not less than a predetermined value. In pre-chamber ignition, the pressure in the main combustion chamber 6 and the pre-chamber 15 basically change as illustrated in FIG. 4.

Regarding the pressure changes, since the injection holes 18 of the pre-chamber 15 become ventilation resistance in the compression stroke, the rise in the pressure in the pre-chamber 15 is slower than in the main combustion chamber 6. That is, the pressure in the pre-chamber 15 is lower than the pressure in the main combustion chamber 6. Then, the air-fuel mixture of the pre-chamber 15 is ignited by firing before the top dead center of the compression stroke, the pressure in the pre-chamber 15 rises sharply, and the pressure in the pre-chamber 15 is higher than the pressure in the main combustion chamber 6 after the top dead center of the compression stroke. The pressure difference between the main combustion chamber 6 and the pre-chamber 15 when the pressure in the pre-chamber 15 is maximized is ΔPmax.

Since the pressure difference between the main combustion chamber 6 and the pre-chamber 15 becomes larger (the pressure in the main combustion chamber 6 becomes larger) as the compression ratio ε is larger because the injection holes 18 become the ventilation resistance as described above, ΔPmax after ignition becomes smaller as the compression ratio ε is larger. On the other hand, for the aperture ratio β, since the pressure is easily released through the injection holes 18 during a pressure rise after ignition in the pre-chamber 15 when the aperture ratio β increases in medium load medium rotation operation, ΔPmax becomes smaller as the aperture ratio β is larger.

That is, ΔPmax depends on the compression ratio ε and the aperture ratio β. Accordingly, ΔPmax can be expressed as follows by using function F1(ε) of the compression ratio ε and function F1(β) of the aperture ratio β.

$$\Delta P\max = F1(\varepsilon) \times F1(\beta) \quad (1)$$

$$F1(\varepsilon) = -0.0062 \times \varepsilon + 0.1949 \quad (2)$$

$$F1(\beta) = 9.51 \times 10-5 \times \beta - 1.754 \quad (3)$$

Here, F1(ε) and F1(β) are derived by a parametric study using a 0-dimensional simulation tool. The tool prepares, in the main combustion chamber of the engine, a small room simulating the pre-chamber and calculates the pressures, temperatures, and densities of the main combustion chamber and the pre-chamber in consideration of energy exchange between the pre-chamber and the main combustion chamber, heat dissipation from the main combustion chamber and the pre-chamber, and the like.

In the calculation, the bore diameter B, the stroke S, the compression ratio ε, the volume V of the pre-chamber, the aperture ratio β, the number of engine revolutions, the fuel injection amount, the excess air rate, the EGR rate, the intake valve closing time, the exhaust valve opening time, the temperature and pressure at the intake valve closing time, the wall temperatures and the heat generation rates of the main combustion chamber and the pre-chamber are set as conditions. The fuel injection amount, the EGR rate, the heat generation rate, and the like are input by simulating the results of an actual single-cylinder engine.

Figure 5:
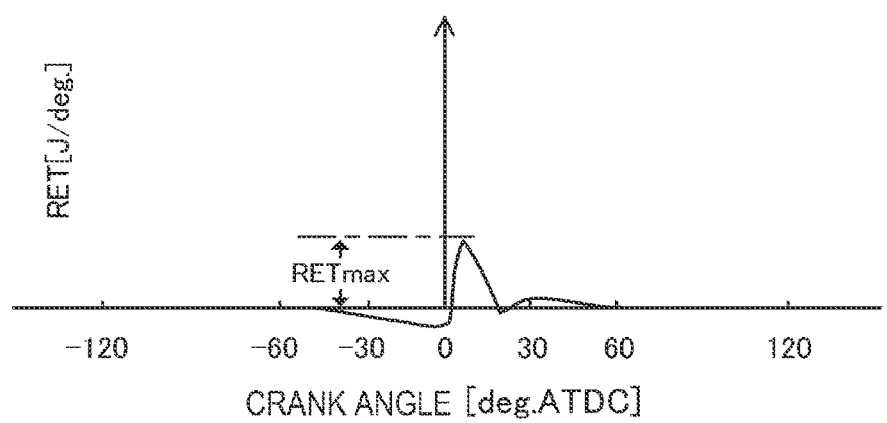
FIG. 5 is a graph illustrating changes in the energy transfer ratio from the pre-chamber to the main combustion chamber in the compression stroke and the expansion stroke of the engine.

FIGS. 4 and 5 illustrate examples of the results calculated under a predetermined medium load EGR operation condition. FIG. 4 illustrates the pressure changes in the main combustion chamber and the pre-chamber as described above and ΔPmax and ΔPig are evaluation indexes. ΔPig is the pressure difference between the main combustion chamber and the pre-chamber at the time of ignition of the air-fuel mixture in the pre-chamber before the top dead center of the compression stroke of the engine, more specifically, at a position 10° before the top dead center of the compression stroke in the embodiment. FIG. 5 illustrates changes in the energy transfer ratio from the pre-chamber to the main combustion chamber and a maximum value RETmax of the energy transfer ratio is an evaluation index. In the following description, RETmax may be referred to as the jet potential.

The calculation described above is performed over hundreds of conditions, and the degree of influence of the compression ratio ε and the aperture ratio β on ΔPmax is regressed from the calculation results to derive the equations of F1(ε) and F1(β) described above.

Figure 6:
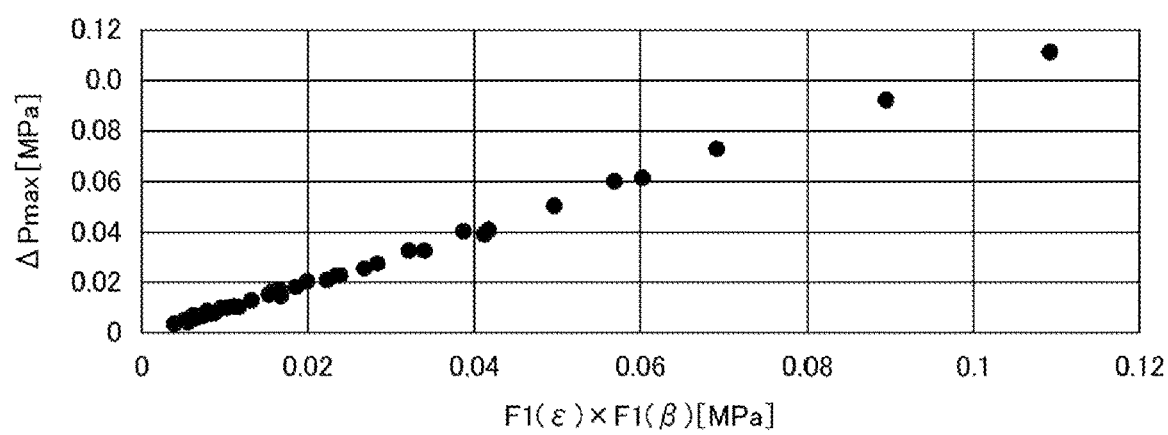
FIG. 6 is a graph illustrating the correlation between the calculation result of ΔPmax and the calculation result of F1(ε)×F1(β) in simulation.

FIG. 6 illustrates the correlation between the calculation result of ΔPmax by the simulation tool and the calculation result of F1(ε)×F1(β) based on equations (1) to (3) shown above. It can be seen that the derived equations (2) and (3) are valid.

It has been confirmed in an experiment that the thermal efficiency of the engine becomes higher than the reference when ΔPmax is not less than 0.02 MPa in the medium load EGR operation. Accordingly, the compression ratio ε set in the first step S1 is substituted into the equation (2) to obtain F1(ε), the value of F1(ε) is substituted into the equation (1) to obtain F1(β) when ΔPmax is assumed to be 0.02 MPa, which is a predetermined value, and the upper limit aperture ratio βmax is obtained from the equation (3). For example, when the compression ratio ε is 17, the upper limit aperture ratio βmax is 0.011.

Next, the lower limit aperture ratio βmin will be described. The lower limit aperture ratio βmin is obtained based on the compression ratio ε set in the first step S1 so that the pressure difference ΔPig between the main combustion chamber and the pre-chamber is not more than the predetermined value in the high load and high rotation operation condition of the engine.

Since the injection holes 18 become ventilation resistance as described above, the pressure difference ΔPig between the main combustion chamber and the pre-chamber becomes larger as the compression ratio ε is larger and the pressure difference ΔPig becomes smaller as the aperture ratio β is larger. That is, ΔPig depends on the compression ratio ε and the aperture ratio β. Accordingly, ΔPig can be expressed as follows by using function F2(ε) of the compression ratio ε and function F2(β) of the aperture ratio β.

$$\Delta Pig = F2(\varepsilon) \times F2(\beta) \quad (4)$$

$$F2(\varepsilon) = 0.1727 \times \exp(0.1309 \times \varepsilon) \quad (5)$$

$$F2(\beta) = -1.0408 \times 10-5 \times \beta - 2.0994 \quad (6)$$

F2(ε) and F2(β) are derived by a parametric study that uses the 0-dimensional simulation tool described above, as in F1(ε) and F1(β) described above. That is, the degree of influence of the compression ratio ε and the aperture ratio β on ΔPmax is regressed from the calculation results to derive the equations of F2(ε) and F2(β) described above.

Figure 7:
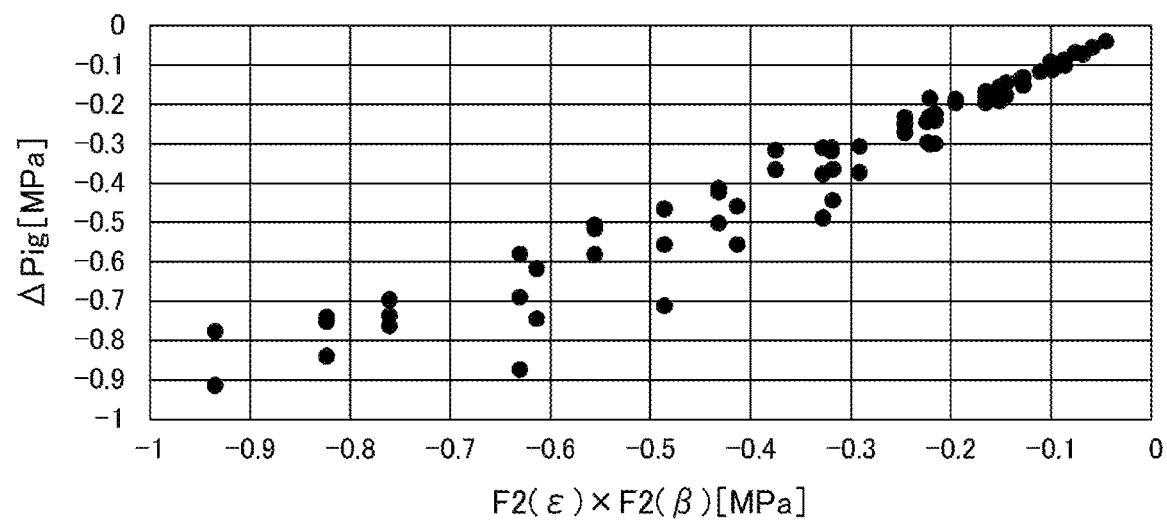
FIG. 7 is a graph illustrating the correlation between the calculation result of ΔPig and the calculation result of F2(ε)×F2(β) in simulation.

FIG. 7 illustrates the correlation between the calculation result of ΔPig by the simulation tool and the calculation result of F2(ε)×F2(β) based on the equations (4) to (6) shown above. It can be seen that the derived equations (5) and (6) are valid. It should be noted that ΔPig is a negative value in FIG. 7 because ΔPig is the value obtained by subtracting the pressure in the main combustion chamber from the pressure in the pre-chamber.

In the high load and high rotation operation, the transfer of gas from the main combustion chamber to the pre-chamber is important (ideally ΔPig=0). As a result of an experiment performed under several conditions in which the aperture ratio β varies, when ΔPig is not less than −0.3 MPa (the pressure difference is small), exchange of gas in the pre-chamber is ensured and good thermal efficiency can be obtained. Accordingly, the compression ratio ε set in the first step S1 is substituted into the equation (5) to obtain F2(ε), the value of F2(ε) is substituted into the equation (4) to obtain F2(β) when ΔPig is assumed to be −0.3 MPa, which is a predetermined value, and the lower limit aperture ratio βmin is obtained from the equation (6). For example, when the compression ratio ε=17, the lower limit aperture ratio βmin is 0.007. (About the third step S3 (determination of the volume V of the pre-chamber))

The volume V of the pre-chamber is set based on the compression ratio ε set in the first step S1 and the aperture ratio β set in the second step S2 by using the dependence of the jet potential on the compression ratio ε, the aperture ratio β, and the volume V of the pre-chamber, as described above.

In the high load and high rotation operation condition of the engine, since the density of the air-fuel mixture in the pre-chamber becomes larger as the compression ratio ε is larger, the jet potential, that is, RETmax, which is the maximum value of the energy transfer ratio from the pre-chamber to the main combustion chamber, becomes larger. In addition, since the exchange of gas in the pre-chamber is better as the aperture ratio β is larger, RETmax becomes larger. In addition, since the amount of heat generated in the pre-chamber is larger as the volume V of the pre-chamber is larger, RETmax becomes larger. That is, RETmax depends on the compression ratio ε, the aperture ratio β, and the volume V of the pre-chamber. Accordingly, RETmax can be expressed as follows by using function F3(ε) of the compression ratio ε, the function F3(β) of the aperture ratio β, and function F3(V) of the volume V of the pre-chamber.

$$\text{RETmax} = F3(\varepsilon) \times F3(\beta) \times F3(V) \tag{7}$$

$$F3(\varepsilon) = 0.9698 \times \ln(\varepsilon) - 1.5623 \tag{8}$$

$$F3(\beta) = 0.8494 \times \ln(\beta) + 5.1483 \tag{9}$$

$$F3(V) = 0.3600 \times \exp(2.6080 \times V) \tag{10}$$

F3(ε), F3(β), and F3(V) are derived by a parametric study using the 0-dimensional simulation tool described above, as in F1(ε) and F1(β) described above. That is, the degree of influence of the compression ratio ε, the aperture ratio β, and the volume V of the pre-chamber on RETmax is regressed from the calculation results to derive the equations of F3(ε), F3(β), and F3(V) described above.

Figure 8:
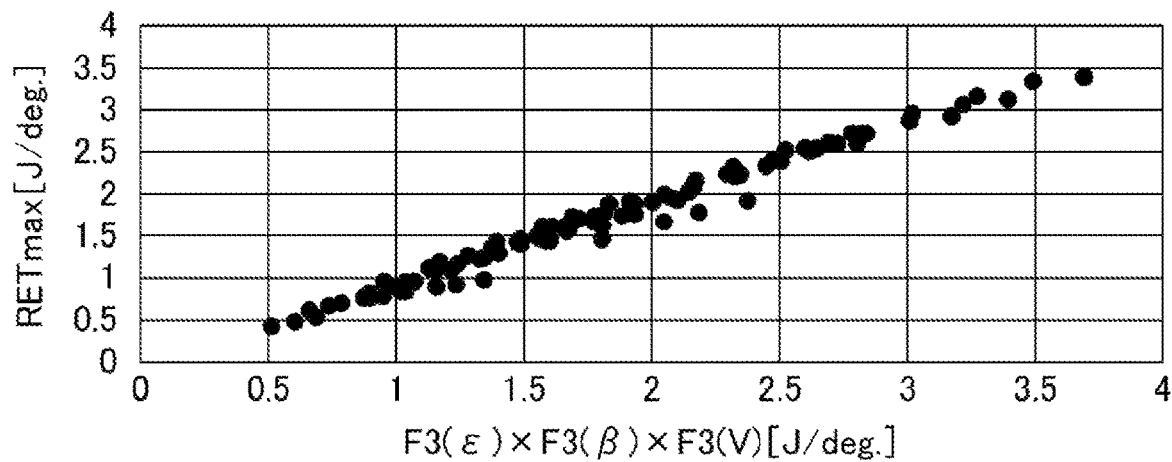
FIG. 8 is a drawing illustrating the correlation between the calculation result of RETmax and the calculation result of F3(ε)×F3(β)×F3(V) in simulation.

FIG. 8 illustrates the correlation between the calculation result of RETmax by the simulation tool and the calculation result of F3(ε)×F3(β)×F3(V) based on the equations (7) to (10) shown above. It can be seen that the derived equations (8) and (10) are valid.

Accordingly, when the requirement of RETmax as the engine performance is determined, the volume V of the pre-chamber for this requirement can be obtained from the equations (7) to (10) shown above. Here, when RETmax is assumed to be a constant as RETmax=a, the volume V of the pre-chamber can be expressed as follows from the equations (7) to (10) shown above.

$$V = (1/2.6080) \times \ln(A) \tag{11}$$

$$A = a/(0.3600 \times (0.9698 \times \ln(\varepsilon) - 1.5623) \times (0.8494 \times \ln(\beta) + 5.1483)) \tag{12}$$

That is, the compression ratio ε set in the first step S1, the aperture ratio set in the second step S2, and value "a" as RETmax are substituted into the equation (12) to obtain A, and the volume V of the pre-chamber is obtained from the equation (11). According to the equations (11) and (12), the volume V of the pre-chamber becomes smaller as the compression ratio ε is larger, the volume V of the pre-chamber becomes smaller as the aperture ratio β is larger, and the volume V of the pre-chamber becomes larger as constant "a" is larger.

(About the Requirement of RETmax)

Figure 9:
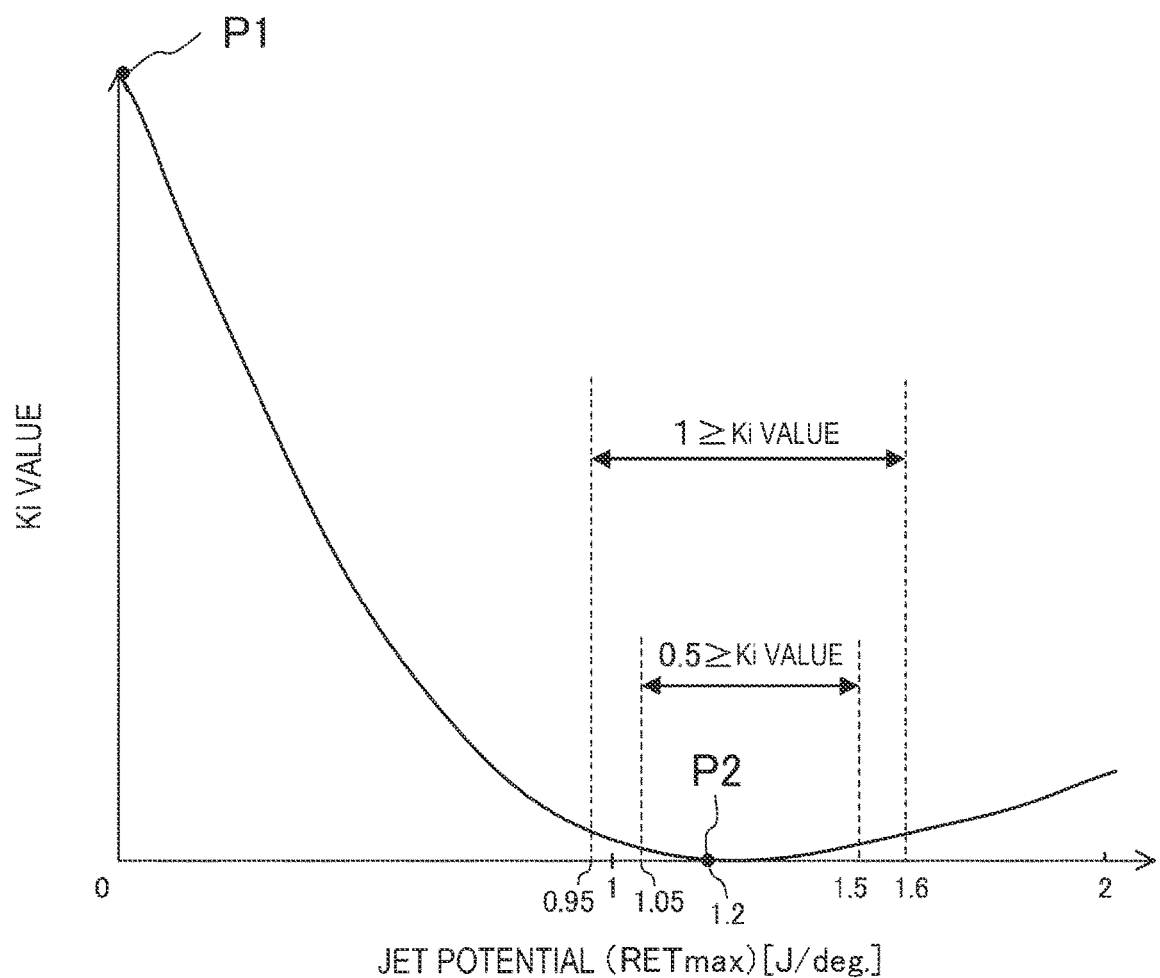
FIG. 9 is a graph illustrating the relationship between a jet potential RETmax and a knock index Ki.

Suppression of knocking (strong knock) is important in the high load and high rotation operation of the engine with a high compression ratio ε. It has been found, from an experiment performed under several conditions with RETmax varying, that knocking can be suppressed when RETmax falls within a predetermined range. FIG. 9 illustrates the relationship between RETmax at 6,000 rpm WOT (wide open throttle) obtained in an experiment and a knocking index (knock strength) Ki. The compression ratio ε of the engine is 17. In the experiment, RETmax varies when the diameter of the injection holes and the volume V of the pre-chamber change.

The Ki value is calculated based on the vibration data of pressure waves generated in the cylinder. The vibration data is detected by a knock sensor, an in-cylinder pressure sensor, or the like. Here, the Ki value indicates the average value of the strengths of knocks generated in 300 combustion cycles. Accordingly, when strong knocks occur in the sampling period, the Ki value increases according to the intensity and frequency thereof.

As illustrated in FIG. 9, an inflection point was observed in the Ki value when RETmax changes from 0 to 2. Specifically, the Ki value is minimized when RETmax is approximately 1.2 J/degree. It is recognized that steep heat generation accompanied by strong columnar vibration occurs when RETmax is large, and the Ki value becomes large. It is also recognized that flame propagation in the main combustion chamber becomes slower when RETmax is small, so self-ignition of end gas is induced and the Ki value becomes large.

Figure 10:
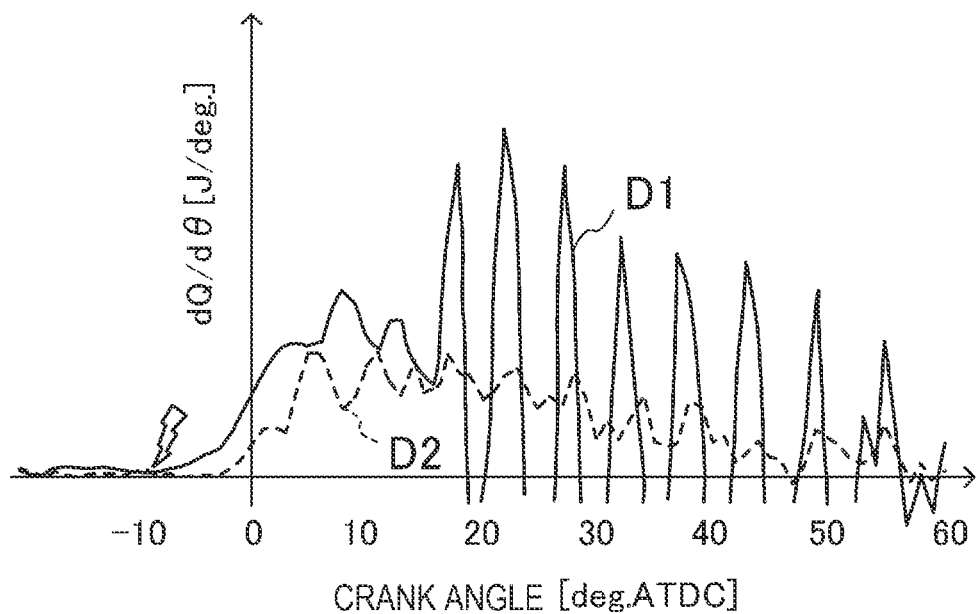
FIG. 10 is a graph illustrating changes in the heat generation rate of the engine.

FIG. 10 illustrates examples of vibration data D1 and D2 at points P1 and P2 in the graph illustrated in FIG. 9. The solid line in the graph represents the vibration data D1 at point P1 at which RETmax is 0 (zero) J/degree. The dashed line in the graph represents the vibration data D2 at point P2 at which RETmax is 1.2 J/degree. The vertical axis represents the heat generation rate and the horizontal axis represents the crank angle.

The vibration data D1 represents the test result of the engine that ignites the air-fuel mixture by using the normal spark plug without the pre-chamber. The vibration data D2 represents the test result of the engine that ignites the air-fuel mixture in the pre-chamber having four injection holes with a diameter of 1.0 mm and a volume V of 0.31 cc. The ignition timing is immediately before the top dead center (−10° ATDC).

The vibration data D1 shows the occurrence of large pressure fluctuations, that is, strong knocks, during a predetermined time period after ignition. In contrast, unlike the vibration data D1, the vibration data D2 does not show large pressure fluctuations. It can be seen that strong knocks are suppressed in the vibration data D2.

Based on the data accumulated so far, the range of the Ki value that is practically preferable is not more than 1, including measurement error, more preferably not more than 0.5. FIG. 9 illustrates the range in which the Ki value is not more than 1 and the range in which the Ki value is not more than 0.5.

Under the high load and high rotation operation condition of the engine, the range within which the Ki value is not more than 1 corresponds to the range in which RETmax is not less than 0.95 J/degree and not more than 1.6 J/degree ("a" in the equation (12) is not less than 0.95 and not more than 1.65). Under the high load and high rotation operation condition of the engine, the range in which the Ki value is not more than 0.5 corresponds to the range in which RETmax is not less than 1.05 and not more than 1.5 ("a" in the equation (12) is not less than 1.05 and not more than 1.5).

According to the manufacturing method described above, the upper limit βmax of the aperture ratio β is set so that ΔPmax is not less than the predetermined value (0.02 MPa at which the thermal efficiency of the engine is higher than a reference value) in the medium load EGR operation condition, the lower limit βmin of the aperture ratio β is set so that ΔPig is not less than a predetermined value (−0.3 MPa at which gas in the pre-chamber is easily performed) in the high load and high rotation operation condition, and the aperture ratio β is set so as to fall within the range from the lower limit βmin to the upper limit βmax. Accordingly, desired thermal efficiency can be ensured in the medium load EGR operation and the high load and high rotation operation.

Then, the volume V of the sub-chamber is set so that RETmax in the high load and high rotation operation condition falls within a predetermined range, which is not less than 0.95 J/degree and not more than 1.6 J/degree ("a" in the equation (12) is not less than 0.95 and not more than 1.65), so the occurrence of knocking can be suppressed in the high load and high rotation operation.

That is, according to the manufacturing method described above, the thermal efficiency can be improved in the medium load EGR operation and knocking can be suppressed in the high load and high rotation operation regardless of the stroke volume of the engine.

Here, for the aperture ratio β, when ΔPmax=0.02 MPa and ΔPig=−0.3 MPa, then the upper limit aperture ratio βmax if the compression ratio ε=14 is 0.0133 mm$^{-1}$ and the lower limit aperture ratio βmin if the compression ratio ε=14 is 0.0078 mm$^{-1}$.

When ΔPmax=0.02 MPa and ΔPig=−0.3 MPa, then the upper limit aperture ratio βmax if the compression ratio ε=24 is 0.0083 mm$^{-1}$ and the lower limit aperture ratio βmin if the compression ratio ε=24 is 0.0145 mm$^{-1}$.

That is, the aperture ratio β when the compression ratio ε is not less than 14 and not more than 24 is not less than 0.0078 mm$^{-1}$ and not more than 0.0145 mm$^{-1}$.

With the object of ensuring a desired thermal efficiency in the medium load EGR operation and in the high load and high rotation operation, the aperture ratio β when the compression ratio ε is not less than 14 and not more than 24 is preferably not less than 0.0078 mm$^{-1}$ and not more than 0.0145 mm$^{-1}$, more preferably not less than 0.0078 mm$^{-1}$ and not more than 0.011 mm$^{-1}$.

For the volume V of the pre-chamber, when RETmax=0.95 J/degree, then V=0.0430 cm$^3$ is satisfied if the compression ratio ε=24 and the aperture ratio β=0.0145$^{-1}$, V=0.2045 cm$^3$ is satisfied if the compression ratio ε=14 and the aperture ratio β=0.0145$^{-1}$, V=0.2018 cm$^3$ is satisfied if the compression ratio ε=24 and the aperture ratio β=0.0078$^{-1}$, and V=0.3635 cm$^3$ is satisfied if the compression ratio ε=14 and the aperture ratio β=0.0078$^{-1}$.

When RETmax=1.6 J/degree, then V=0.2428 cm$^3$ is satisfied if the compression ratio ε=24 and the aperture ratio β=0.0145$^{-1}$, V=0.4045 cm$^3$ is satisfied if the compression ratio ε=14 and the aperture ratio β=0.0145$^{-1}$, V=0.4017 cm$^3$ is satisfied if the compression ratio ε=24 and the aperture ratio β=0.0078$^{-1}$, and V=0.5631 cm$^3$ is satisfied if the compression ratio ε=14 and the aperture ratio β=0.0078$^{-1}$.

As described above, the volume V of the pre-chamber ranges from 0.0430 cm$^3$ to 0.5631 cm$^3$. With the object of suppressing the occurrence of knocking in the high load and high rotation operation, the volume V of the pre-chamber is preferably not less than 0.12 cm$^3$ and not more than 0.328 cm$^3$, more preferably not less than 0.2 cm$^3$ and not more than 0.328 cm$^3$.

<First Index>

The product of the total cross-sectional area St [cm$^2$] of the plurality of the injection holes in the pre-chamber and the compression ratio ε is defined as a first index St·ε [cm$^2$]. The first index St·ε is obtained based on the upper limit aperture ratio βmax or the lower limit aperture ratio βmin, whichever is larger. The aperture ratio β=0.0145 mm$^{-1}$ when ε=24, and β=0.0133 mm$^{-1}$ when ε=14.

When RETmax=0.95 J/degree, if ε=24 and β=0.0145 mm$^{-1}$, then V=0.0430 cm$^3$, St=0.006235 cm$^2$, and St·ε=0.1496 cm$^2$ are satisfied. When RETmax=0.95 J/degree, if ε=14 and β=0.0133 mm$^{-1}$, then V=0.222 cm$^3$, St=0.02956 cm$^2$, and St·ε=0.4139 cm$^2$ are satisfied.

When RETmax=1.6 J/degree, if ε=24 and β=0.0145 mm$^{-1}$, then V=0.2428 cm$^3$, St=0.0352 cm$^2$, and St·ε=0.8449 cm$^2$ are satisfied. When RETmax=1.6 J/degree, if ε=14 and β=0.0133 mm$^{-1}$, then V=0.4225 cm$^3$, St=0.05626 cm$^2$, and St·ε=0.7877 cm$^2$ are satisfied.

When RETmax=1.05 J/degree, if ε=24 and β=0.0145 mm$^{-1}$, then V=0.0813 cm$^3$, St=0.01179 cm$^2$, and St·ε=0.2829 cm$^2$ are satisfied. When RETmax=1.05 J/degree, if ε=14 and β=0.0133 mm$^{-1}$, then V=0.2614 cm$^3$, St=0.03481 cm$^2$, and St·ε=0.4873 cm$^2$ are satisfied.

When RETmax=1.5 J/degree, if ε=24 and β=0.0145 mm$^{-1}$, then V=0.2181 cm$^3$, St=0.03162 cm$^2$, and St·ε=0.7590 cm$^2$ are satisfied. When RETmax=1.5 J/degree, if ε=14 and β=0.0133 mm$^{-1}$, then V=0.398 cm$^3$, St=0.053 cm$^2$, and St·ε=0.742 cm$^2$ are satisfied.

When RETmax=1.2 J/degree, if ε=24 and β=0.0145 mm$^{-1}$, then V=0.1325 cm$^3$, St=0.01921 cm$^2$, and St·ε=0.4611 cm$^2$ are satisfied. When RETmax=1.2 J/degree, if ε=14 and β=0.0133 mm$^{-1}$, then V=0.312 cm$^3$, St=0.04155 cm$^2$, and St·ε=0.5817 cm$^2$ are satisfied.

As described above, when the compression ratio ε is not less than 14 and not more than 24, the first index St·ε is preferably not less than 0.1496 cm$^2$ and not more than 0.8449 cm$^2$ so that the Ki value is not more than 1, that is, so that RETmax is not less than 0.95 J/degree and not more than 1.6 J/degree.

In addition, when the compression ratio ε is not less than 14 and not more than 24, the first index St·ε is preferably not less than 0.2829 cm$^2$ and not more than 0.7590 cm$^2$ so that the Ki value is not more than 0.5, that is, so that RETmax is not less than 1.05 J/degree and not more than 1.5 J/degree.

Furthermore, when the compression ratio $\varepsilon$ is not less than 14 and not more than 24, the first index St·$\varepsilon$ is preferably not less than 0.4611 cm$^2$ and not more than 0.5817 cm$^2$ so that the Ki value is approximately 0 (approximately a local minimum value), that is, so that RETmax is near 1.2 J/degree.

Figure 11:
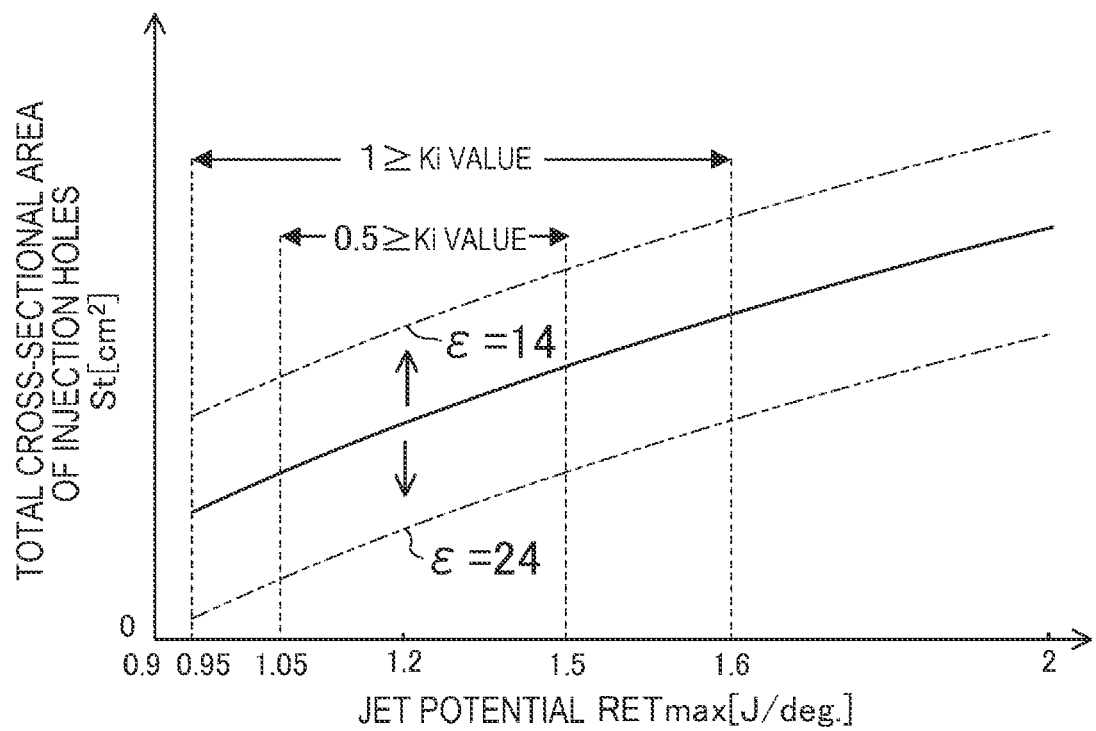
FIG. 11 is a graph illustrating the relationship between the jet potential RETmax and the total cross-sectional area St of injection holes.
Figure 12:
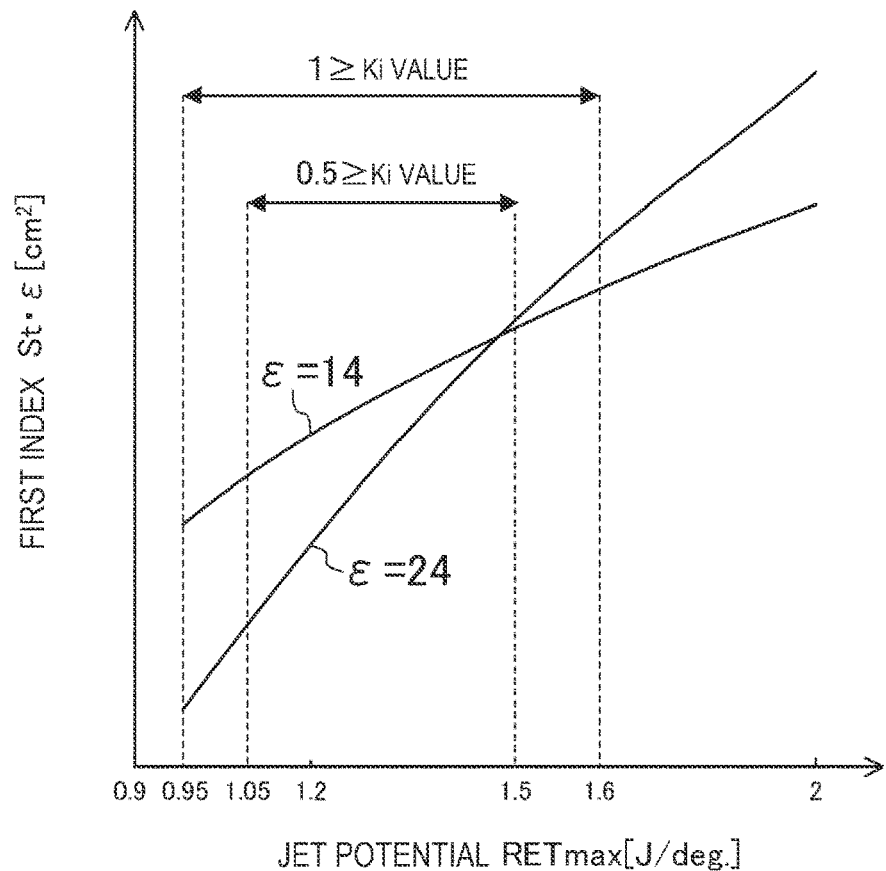
FIG. 12 is a graph illustrating the relationship between the jet potential RETmax and a first index St.·ε.

FIG. 11 is a graph illustrating the relationship between the jet potential RETmax and the total cross-sectional area St of the injection holes. FIG. 12 is a graph illustrating the relationship between the jet potential RETmax and the first index St·$\varepsilon$.

As illustrated in FIG. 11, as the jet potential RETmax is larger, the total cross-sectional area St needs to be larger. When the compression ratio $\varepsilon$=24, the total cross-sectional area St required to obtain the jet potential RETmax with the same magnitude is smaller than when the compression ratio $\varepsilon$=14. That is, the required total cross-sectional area St becomes smaller as the compression ratio $\varepsilon$ is larger.

As illustrated in FIG. 12, the first index St·$\varepsilon$ becomes larger as the jet potential RETmax is larger. The curve of the first index St·$\varepsilon$ for $\varepsilon$=14 intersects the curve of the first index St·$\varepsilon$ for $\varepsilon$=24 halfway. Specifically, when the jet potential RETmax is small, the first index St·$\varepsilon$ for $\varepsilon$=24 is smaller than the first index St·$\varepsilon$ for $\varepsilon$=14. When the jet potential RETmax is large, the first index St·$\varepsilon$ for $\varepsilon$=24 is larger than the first index St·$\varepsilon$ for $\varepsilon$=14.

<Second Index>

The product of the volume V [cm$^3$] of the pre-chamber and the compression ratio $\varepsilon$ is defined as a second index V·$\varepsilon$ [cm$^3$]. The second index V·$\varepsilon$ is obtained based on the upper limit aperture ratio $\beta$max and the lower limit aperture ratio $\beta$min, whichever is larger. The aperture ratio $\beta$=0.0145 mm−1 when $\varepsilon$=24 and $\beta$=0.0133 mm−1 when $\varepsilon$=14.

When RETmax=0.95 J/degree, if $\varepsilon$=24 and $\beta$=0.0145 mm$^{-1}$, then V=0.0430 cm$^3$ and V·$\varepsilon$=1.03 cm$^3$ are satisfied. When RETmax=0.95 J/degree, if $\varepsilon$=14 and $\beta$=0.0133 mm$^{-1}$, then V=0.222 cm$^3$ and V·$\varepsilon$=3.11 cm$^3$ are satisfied.

When RETmax=1.6 J/degree, if $\varepsilon$=24 and $\beta$=0.0145 mm$^{-1}$, then V=0.2428 cm$^3$ and V·$\varepsilon$=5.827 cm$^3$ are satisfied. When RETmax=1.6 J/degree, if $\varepsilon$=14 and $\beta$=0.0133 mm$^{-1}$, V=0.4225 cm$^3$ and V·$\varepsilon$=5.92 cm$^3$ are satisfied.

When RETmax=1.05 J/degree, if $\varepsilon$=24 and $\beta$=0.0145 mm$^{-1}$, then V=0.0813 cm$^3$ and V·$\varepsilon$=1.95 cm$^3$ are satisfied. When RETmax=1.05 J/degree, if $\varepsilon$=14 and $\beta$=0.0133 mm$^{-1}$, then V=0.2614 cm$^3$ and V·$\varepsilon$=3.66 cm$^3$ are satisfied.

When RETmax=1.5 J/degree, if $\varepsilon$=24 and $\beta$=0.0145 mm$^{-1}$, then V=0.2181 cm$^3$ and V·$\varepsilon$=5.234 cm$^3$ are satisfied. When RETmax=1.5 J/degree, if $\varepsilon$=14 and $\beta$=0.0133 mm$^{-1}$, then V=0.398 cm$^3$ and V·$\varepsilon$=5.57 cm$^3$ are satisfied.

When RETmax=1.2 J/deg, if $\varepsilon$=24 and $\beta$=0.0145 mm$^{-1}$, then V=0.1325 cm$^3$ and V·$\varepsilon$=3.18 cm$^3$ are satisfied. When RETmax=1.2 J/degree, if $\varepsilon$=14 and $\beta$=0.0133 mm$^{-1}$, then V=0.312 cm$^3$ and V·$\varepsilon$=4.37 cm$^3$ are satisfied.

As described above, when the compression ratio $\varepsilon$ is not less than 14 and not more than 24, the second index V·$\varepsilon$ is preferably not less than 1.03 cm$^3$ and not more than 5.92 cm$^3$ so that the Ki value is not more than 1, that is, so that RETmax is not less than 0.95 J/degree and not more than 1.6 J/degree.

As described above, when the compression ratio $\varepsilon$ is not less than 14 and not more than 24, the second index V·$\varepsilon$ is preferably not less than 1.95 cm$^3$ and not more than 5.57 cm$^3$ so that the Ki value is not more than 0.5, that is, so that RETmax is not less than 1.05 J/degree and not more than 1.5 J/degree.

Furthermore, when the compression ratio $\varepsilon$ is not less than 14 and not more than 24, the second index V·$\varepsilon$ is preferably not less than 3.18 cm$^3$ and not more than 4.37 cm$^3$ so that the Ki value is approximately 0 (approximately a local minimum value), that is, so that RETmax is approximately 1.2 J/degree.

Figure 13:
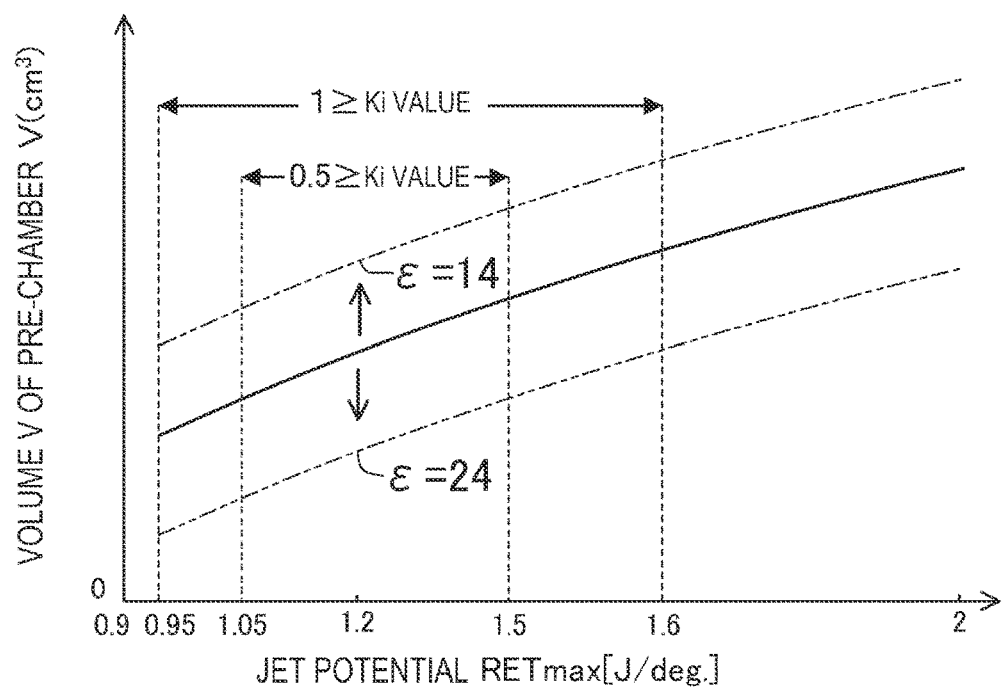
FIG. 13 is a graph illustrating the relationship between the jet potential RETmax and a volume V of the pre-chamber.
Figure 14:
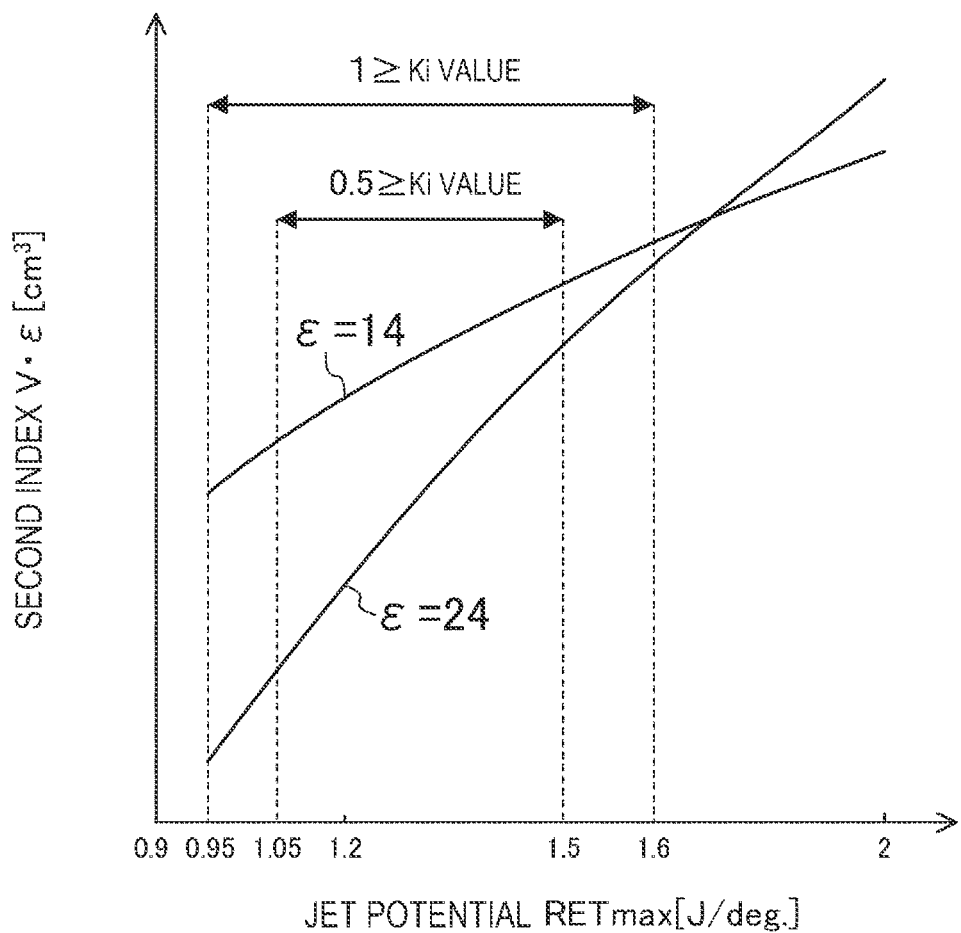
FIG. 14 is a graph illustrating the relationship between the jet potential RETmax and a second index V·ε.

FIG. 13 is a graph illustrating the relationship between the jet potential RETmax and the volume V of the pre-chamber. FIG. 14 is a graph illustrating the relationship between the jet potential RETmax and the second index V·$\varepsilon$.

As illustrated in FIG. 13, as the jet potential RETmax is larger, the volume V of the pre-chamber needs to be larger. When the compression ratio $\varepsilon$=24, the volume V of the pre-chamber required to obtain the jet potential RETmax with the same magnitude is smaller than when the compression ratio $\varepsilon$=14. That is, the required volume V of the pre-chamber is smaller as the compression ratio $\varepsilon$ is larger.

As illustrated in FIG. 14, the second index V·$\varepsilon$ becomes larger as the jet potential RETmax is larger. The curve of the second index V·$\varepsilon$ for $\varepsilon$=14 intersects the curve of the second index V·$\varepsilon$ for $\varepsilon$=24 halfway. Specifically, when the jet potential RETmax is small, the second index V·$\varepsilon$ for $\varepsilon$=24 is smaller than the second index V·$\varepsilon$ for $\varepsilon$=14. When the jet potential RETmax is large, the second index V·$\varepsilon$ for $\varepsilon$=24 is larger than the second index V·$\varepsilon$ for $\varepsilon$=14.

<Operation and Effect>

As a result of various studies on pre-chamber ignition, the inventors of the present disclosure have found that it is possible to meet both the request to improve the thermal efficiency in the medium load EGR operation and the request to suppress knocking in the high load and high rotation operation even in this ignition combustion system. In addition, the inventors of the present application have found that the knocking index (knock strength or Ki value) in the high load and high rotation operation is a function of the jet potential RETmax and that the function has a local minimum value (inflection point) (see FIG. 9). This means that the occurrence of knocking in the high load and high rotation operation can be suppressed by keeping the jet potential RETmax within a range around the local minimum value.

The compression ratio $\varepsilon$ can be determined based on requests for the thermal efficiency and the ignition timing. On the other hand, when the compression ratio $\varepsilon$ is small, the filling degree of air or the air-fuel mixture from the main combustion chamber to the pre-chamber is small. Accordingly, the compression ratio $\varepsilon$ is not less than 14 with the object of obtaining, into the pre-chamber, the air-fuel mixture that is surely ignited by firing in the medium load EGR operation. However, since an increase in the compression ratio $\varepsilon$ easily causes knocking at high load and high rotation, the upper limit is 24.

The first index St·$\varepsilon$ is not less than 0.1496 cm$^2$ and not more than 0.8449 cm$^2$ with the object of suppressing knocking in the high load and high rotation operation and improving the thermal efficiency in the medium load EGR operation.

Here, as illustrated in FIG. 11, to increase the jet potential RETmax, the total cross-sectional area St needs to be increased with the object of making the exchange of gas in the pre-chamber successful. In contrast, to reduce the jet potential RETmax, the total cross-sectional area St needs to be reduced. Accordingly, as illustrated in FIG. 12, the first index St·$\varepsilon$ is larger as the jet potential RETmax is larger, and the first index St·$\varepsilon$ is smaller as the jet potential RETmax is smaller.

Since the filling degree of the air-fuel mixture from the main combustion chamber to the pre-chamber becomes higher as the compression ratio ε is larger, the jet potential RETmax more easily increases. As illustrated in FIG. 11, in order to obtain the jet potential RETmax with the same magnitude, the total cross-sectional area St needs to be small when the compression ratio ε is large (ε=24), while the total cross-sectional area St needs to be large when the compression ratio ε is small (ε=14). Accordingly, in the first index St·ε obtained by multiplying the total cross-sectional area St by the compression ratio ε, the amount of change (increase amount/decrease amount) in the compression ratio ε is leveled by the amount of change (decrease amount/increase amount) in the total cross-sectional area St.

Accordingly, as illustrated in FIG. 12, even if the compression ratio ε increases or decreases, the total cross-sectional area St increases or decreases so as to cancel the increase or decrease in the compression ratio ε, so the effect of the compression ratio ε on the first index St·ε is mitigated. The first index St·ε mainly depends on the jet potential RETmax.

Accordingly, the jet potential RETmax can be uniquely defined regardless of the magnitude of the compression ratio ε by obtaining the first index St·ε based on the total cross-sectional area St (the number of injection holes multiplied by the diameter of injection holes) and the compression ratio ε.

By setting the first index St·ε to a value not less than 0.1496 cm$^2$ and not more than 0.8449 cm$^2$, the jet potential RETmax can be advantageously kept within the range (specifically, within the range of the jet potential RETmax from 0.95 J/degree to 1.6 J/degree) near the local minimum value in the function of the knocking index in the high load and high rotation operation (see FIG. 9). This can advantageously set the Ki value to 1 or less. Accordingly, knocking can be suppressed from occurring due to an excessive increase in the jet potential RETmax in the high load and high rotation operation.

Furthermore, since the first index St·ε is not less than 0.1496 cm$^2$, the jet potential RETmax can be prevented from becoming excessively small in the medium load EGR operation. That is, the thermal efficiency can be advantageously improved by obtaining a desired jet potential RETmax in the medium load EGR operation.

As described above, it is possible to meet both the request to improve the thermal efficiency in the medium load EGR operation and the request to suppress knocking in the high load and high rotation operation.

Knocking can be more advantageously suppressed in the high load and high rotation operation by setting the first index St·ε to a value not less than 0.2829 cm$^2$ and not more than 0.7590 cm$^2$. More specifically, the jet potential RETmax can be advantageously kept within the range from 1.05 J/degree to 1.5 J/degree (see FIG. 9). This can advantageously set the Ki value to 0.5 or less.

Knocking can be still more advantageously suppressed in the high load and high rotation operation by setting the first index St·ε to a value not less than 0.4611 cm$^2$ and not more than 0.5817 cm$^2$. Specifically, the jet potential RETmax can be advantageously kept within the range around 1.2 J/degree (see FIG. 9). This can advantageously set the Ki value to approximately 0 (approximately the local minimum value).

Knocking can be more surely suppressed in the high load and high rotation operation by designing the pre-chamber so as to keep the jet potential RETmax within a predetermined range (for example, a range from 0.95 J/degree to 1.6 J/degree).

The volume V of the pre-chamber affects the magnitude of the jet potential RETmax. Since the volume V is not less than 0.12 cm$^3$, a relatively large jet potential RETmax can be obtained even in the medium load EGR operation. On the other hand, since the upper limit of the volume V is 0.328 cm$^3$, the jet potential RETmax can be prevented from becoming excessively large at the high load and high rotation.

When the number of injection holes 18 is not less than four and not more than six, the first index St·ε can be easily kept within the range described above.

In the passive type pre-chamber ignition (pre-chamber plug 12), the air-fuel mixture can be introduced to the periphery of the spark plug 16 in the pre-chamber 15 through the injection holes 18 without having the injector 11 in the pre-chamber 15.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

ε: compression ratio
β: aperture ratio
V: volume of pre-chamber
St: total cross-sectional area
ΔPmax: pressure difference
ΔPig: pressure difference
RETmax: jet potential
Ki: knock index
St·ε: first index
V·ε: second index
1: engine
2: cylinder block
3: cylinder head
4: cylinder
5: piston
6: main combustion chamber
11: injector
12: pre-chamber plug
13: normal spark plug
15: pre-chamber
16: spark plug
17: pre-chamber forming portion
18: injection hole

The invention claimed is:

1. An engine comprising:
a main combustion chamber including a cylinder block, a cylinder head, and a piston;
a pre-chamber having a plurality of injection holes that open into the main combustion chamber; and
a spark plug that ignites an air-fuel mixture in the pre-chamber,
wherein a compression ratio ε of the main combustion chamber is not less than 14 and not more than 24, and an index St·ε that is a product between a total cross-sectional area St of the plurality of injection holes and the compression ratio ε is not less than 0.1496 cm$^2$ and not more than 0.8449 cm$^2$.

2. The engine according to claim 1,
wherein the index St·ε is not less than 0.2829 cm$^2$ and not more than 0.7590 cm$^2$.

3. The engine according to claim 1,
wherein a maximum value of an energy transfer ratio from the pre-chamber to the main combustion chamber is not less than 0.95 J/degree and not more than 1.6 J/degree under a high load and high rotation operation condition of the engine.

4. The engine according to claim 1, wherein a volume of the pre-chamber is not less than 0.12 cm³ and not more than 0.328 cm³.

5. The engine according to claim 1, wherein the number of the injection holes is not less than four and not more than six.

6. The engine according to claim 1, further comprising an injector that injects fuel to form the air-fuel mixture so as to inject the fuel into the main combustion chamber.

7. The engine according to claim 2, wherein the index St·ε is not less than 0.4611 cm² and not more than 0.5817 cm².

8. The engine according to claim 2, wherein a maximum value of an energy transfer ratio from the pre-chamber to the main combustion chamber is not less than 0.95 J/degree and not more than 1.6 J/degree under a high load and high rotation operation condition of the engine.

9. The engine according to claim 2, wherein a volume of the pre-chamber is not less than 0.12 cm³ and not more than 0.328 cm³.

10. The engine according to claim 2, wherein the number of the injection holes is not less than four and not more than six.

11. The engine according to claim 2, further comprising an injector that injects fuel to form the air-fuel mixture so as to inject the fuel into the main combustion chamber.

12. The engine according to claim 7, wherein a maximum value of an energy transfer ratio from the pre-chamber to the main combustion chamber is not less than 0.95 J/degree and not more than 1.6 J/degree under a high load and high rotation operation condition of the engine.

13. The engine according to claim 7, wherein a volume of the pre-chamber is not less than 0.12 cm³ and not more than 0.328 cm³.

14. The engine according to claim 7, wherein the number of the injection holes is not less than four and not more than six.

15. The engine according to claim 7, further comprising an injector that injects fuel to form the air-fuel mixture so as to inject the fuel into the main combustion chamber.

16. The engine according to claim 12, wherein a volume of the pre-chamber is not less than 0.12 cm³ and not more than 0.328 cm³.

17. The engine according to claim 12, wherein the number of the injection holes is not less than four and not more than six.

18. The engine according to claim 12, further comprising an injector that injects fuel to form the air-fuel mixture so as to inject the fuel into the main combustion chamber.

19. The engine according to claim 16, wherein the number of the injection holes is not less than four and not more than six.

20. The engine according to claim 19, further comprising an injector that injects fuel to form the air-fuel mixture so as to inject the fuel into the main combustion chamber.

* * * * *